United States Patent
Lazarus et al.

(10) Patent No.: US 6,291,928 B1
(45) Date of Patent: Sep. 18, 2001

(54) HIGH BANDWIDTH, LARGE STROKE ACTUATOR

(75) Inventors: Kenneth B. Lazarus, Concord; Jeffrey W. Moore, Arlington; Erik Saarmaa, Boston; Eric Fitch, Medford; Carl Prestia, Groton; Edward F. Crawley, Cambridge, all of MA (US)

(73) Assignee: Active Control Experts, Inc., Cambridge, MA (US)

( * ) Notice: Subject to any disclaimer, the term of this patent is extended or adjusted under 35 U.S.C. 154(b) by 0 days.

(21) Appl. No.: 09/461,941

(22) Filed: Dec. 15, 1999

Related U.S. Application Data

(63) Continuation-in-part of application No. 09/237,154, filed on Jan. 25, 1999.
(60) Provisional application No. 60/112,466, filed on Dec. 16, 1998.

(51) Int. Cl.[7] .................................................. H01L 41/08
(52) U.S. Cl. ........................................... 310/328; 310/324
(58) Field of Search ...................................... 310/324, 328

(56) References Cited

U.S. PATENT DOCUMENTS

| | | | |
|---|---|---|---|
| 4,570,095 | * | 2/1986 | Uchikawa .......................... 310/328 |
| 4,703,215 | * | 10/1987 | Asano ................................. 310/328 |
| 4,874,980 | * | 10/1989 | Mine et al. ......................... 310/328 |
| 4,937,489 | * | 6/1990 | Hattori et al. ...................... 310/328 |
| 5,875,632 | * | 3/1999 | Kappel et al. ..................... 310/328 |
| 5,946,969 | * | 9/1999 | Munekata et al. ................. 310/328 |
| 6,003,836 | * | 12/1999 | Cewers ........................... 251/129.06 |
| 6,157,115 | * | 12/2000 | Hassler .............................. 310/328 |

\* cited by examiner

*Primary Examiner*—Thomas M. Dougherty
(74) *Attorney, Agent, or Firm*—Testa, Hurwitz & Thibeault LLP

(57) ABSTRACT

A hybrid actuator includes strain actuated elements that displace fluid to move a piston, with the elements forming a fluid housing, and being oriented and actuated to optimize force, stroke or bandwidth. In one preferred embodiment the elements are cylinders enclosing the fluid, with radial and axial components of strain-induced dimensional change adding together to enhance displacement. In another preferred embodiment, piezo bender elements produce large stroke, high bandwidth movements. Strokes of up to fifty percent of actuator length, and bandwidths above 500 Hz are achieved in light weight electrically actuated devices free of external piping or hydraulics. The actuator is readily integrated into a gate valve, sub-woofer, or other driven device.

13 Claims, 14 Drawing Sheets

CONFIGURATION A

AVAILABLE STROKE AS A FUNCTION OF ACTUATOR PARAMETERS

| ACTUATOR PARAMETERS | CASE 1 | CASE 2 |
|---|---|---|
| h | 0.020" | 0.016" |
| L | 1.5" | 2.0" |
| $\frac{\Delta L}{L}$ | 16.8% | 46.9% |

ACTUATOR CONFIGURATION
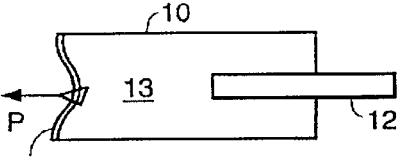

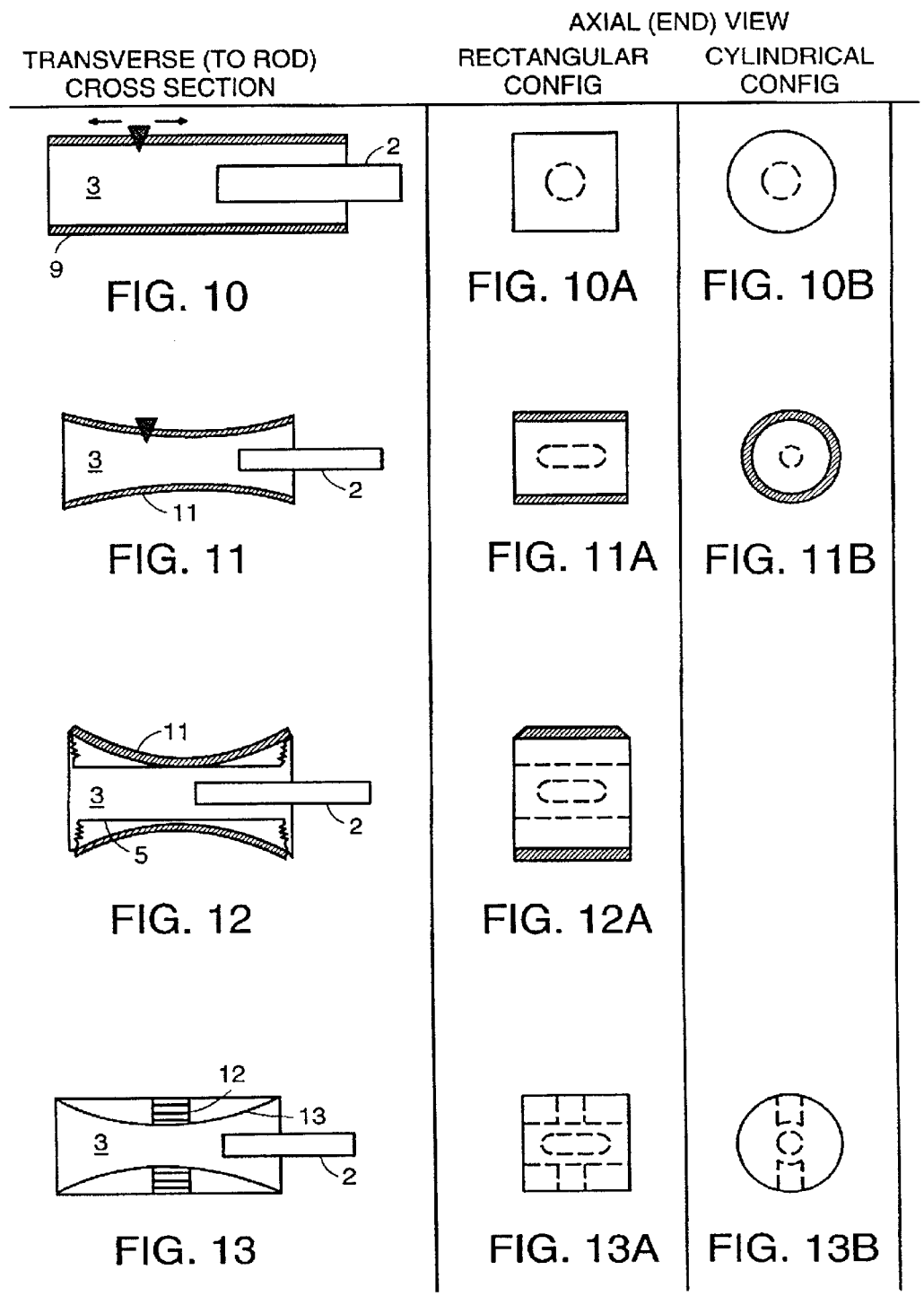

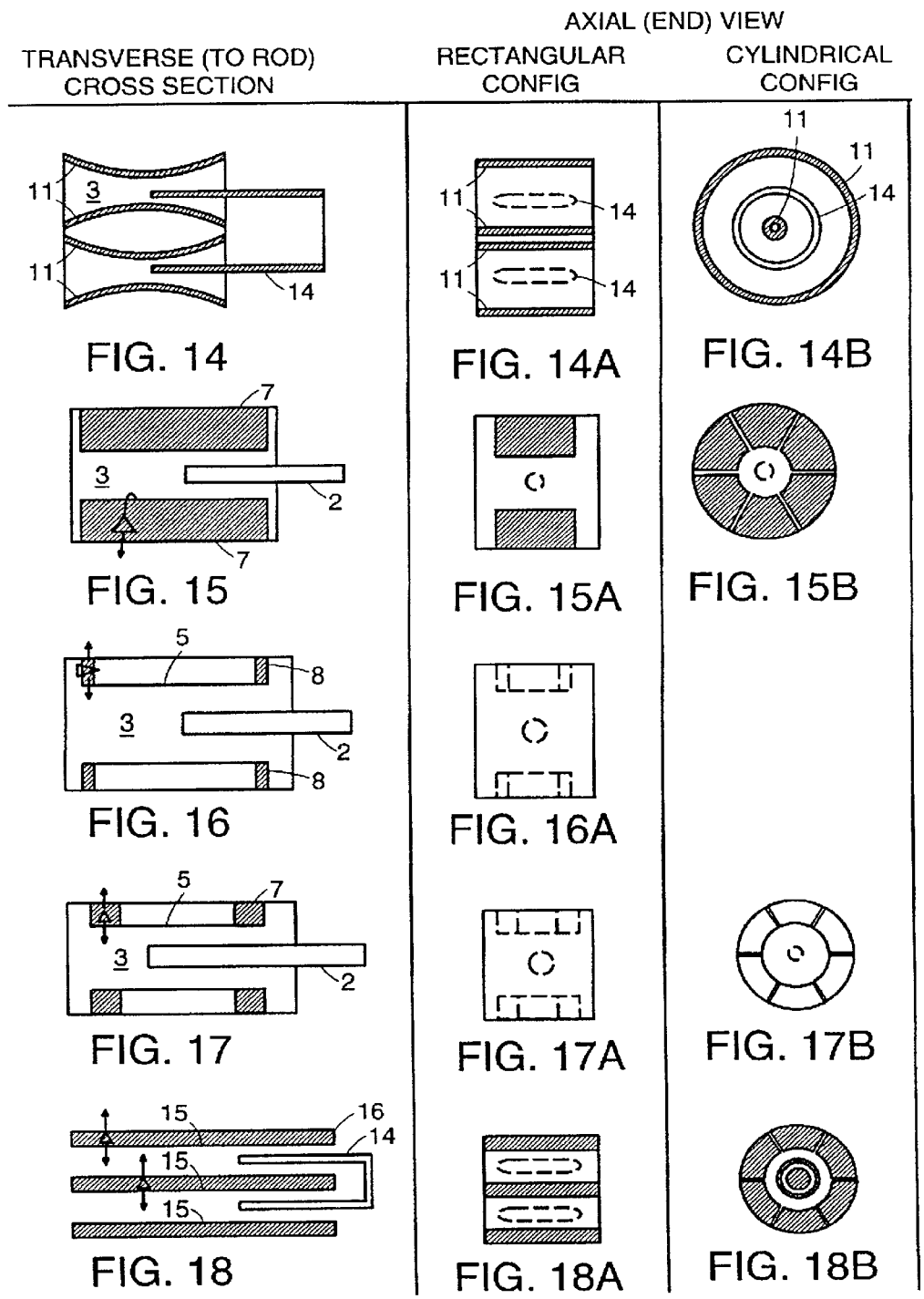

DESIGN CURVES FOR PIEZO-HIDRAULIC LINEAR DISPLACEMENT ACTUATOR. A 1/2 in. DIAMETER ACTUATOR WAS ASSUMED WITH A1/32 in. DIAMETER PISTON ROD. MOTION SHOWN IS FOR A POSITIVE APPLIED VOLTAGE. NEGATIVE VOLTAGE YIELD EQUAL DISPLACEMENT IN THE OPPOSITE DIRECTION.

| MATERIAL PROPERTY | UNITS | PZT | PMN | TERFENOL | SMA |
|---|---|---|---|---|---|
| YOUNG'S MODULUS, E | GPa | 62 | 117 | 30 | 30/89 |
| YIELD OR ULT. STRENGTH | MPa | 70 | 21 | 28 | 74/670 |
| STRAIN CONSTANT, $d_{33}$ | m/v $\times 10^{12}$ | 360 | $285^h$ | – | – |
| STRESS CONSTANT, $g_{33}$ | m/C$\times 10^3$ | 25 | – | – | – |
| COERCIVE OR MAX. FIELD | V/µm | 1.2 | 2.0 | – | – |
| BANDWIDTH | CYCLES/S | KHz | KHz | 100Hz | 1Hz |

DESIGN CURVES FOR PIAZO-HYDRAULIC LINEAR DISPLACEMENT ACTUATORS WITH CASING DIAMETERS D OF 2.0 AND 3.0 cm AND PISTON DIAMETERS d OF 0.16, 0.32 AND 0.48 cm. THE LENGTH L OF EACH ACTUATOR IS ASSUMED FIXED AT 2.0 cm.

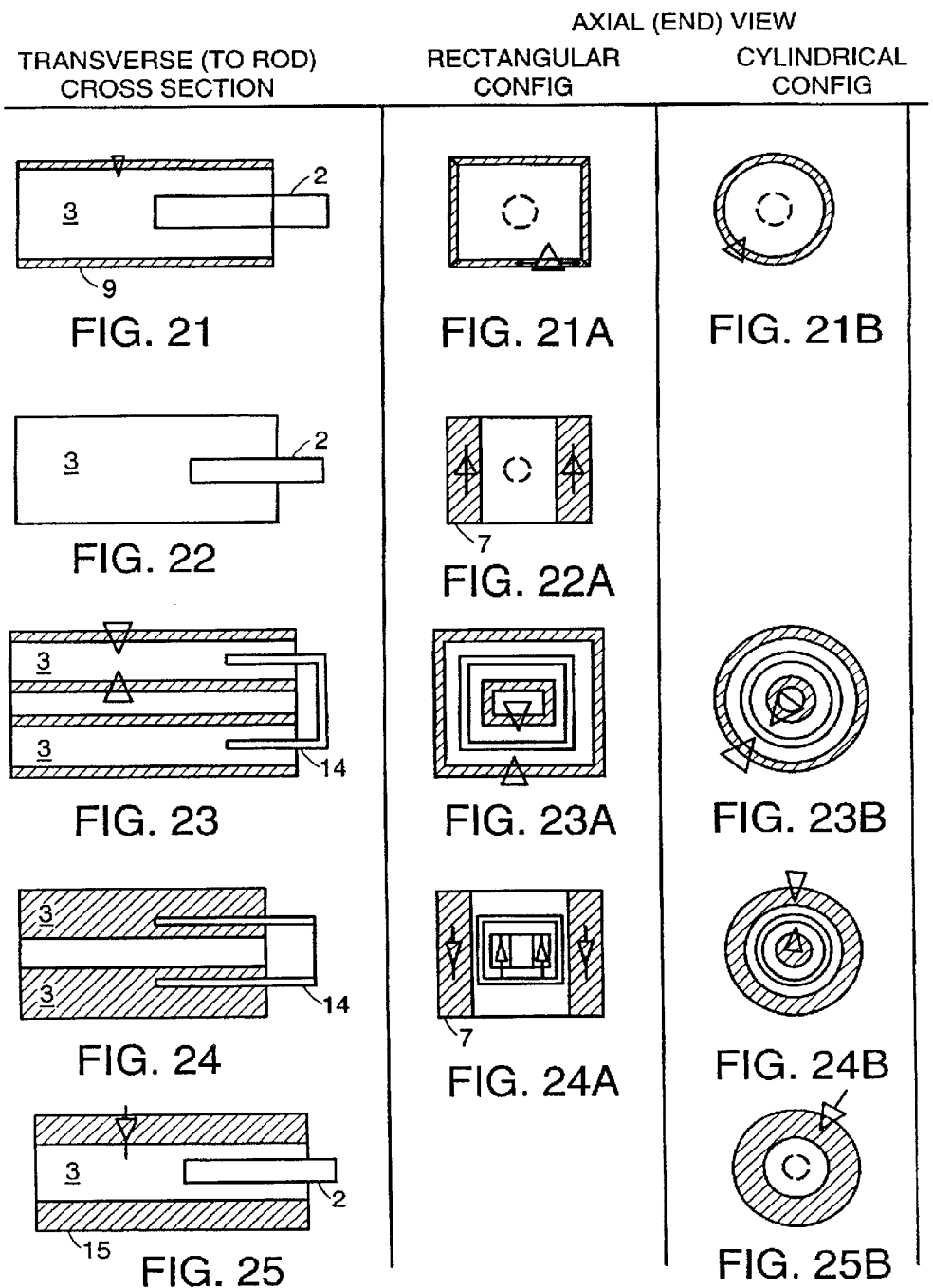

HIGH BANDWIDTH, LARGE STROKE ACTUATOR

RELATED APPLICATIONS

This application claims priority to U.S. application Ser. No. 60/112,466, filed Dec. 16, 1998, and is a continuation-in-part of U.S. application Ser. No. 09/237,154, filed Jan. 25, 1999, both of which are incorporated by reference herein.

GOVERNMENT SUPPORT

This invention was made with government support under Contract Number DAAH01-96-C-R024 awarded by the U.S. Army Missile Command. The government may have certain rights in the invention.

BACKGROUND OF THE INVENTION

The present invention relates to actuators or motors for producing motion.

By far the most commonly used actuators for motion control are inductive in nature. Examples are linear and rotary solenoids, brushed and brushless dc motors, brushless linear dc motors, and stepper motors. These inductive actuators are appropriate in velocity control applications with relatively low torque requirements. However, even there, the stiffness and bandwidth of an inductive motor are limited by properties of the magnetic coupling between the permanent magnet and the windings.

In many applications, a high force, quasi-static position actuator is desired. Achieving high torque outputs from an electric motor presents a variety of mechanical and electrical problems. Often, to obtain high torque outputs, some form of mechanical transmission is employed. However, the transmission reduces the actuator bandwidth and contributes to mechanical losses and backlash. In addition to transmission concerns, the motor itself has limitations, in that significant currents have to pass through the motor windings to increase motor torque outputs when the motor is operated close to stall. This causes high power dissipation through the winding resistance and results in a corresponding need to transfer the generated heat away. Further, the design and operation of inductive motors is complicated by the need to commutate the magnetic field. Commutation introduces significant torque ripple at low velocity and degrades overall torque output. Electrical commutation, as used in brushless motors, requires a motor position sensor whose output is fed back to a relatively complex controller. In a brushed motor, high currents at low velocities cause arcing of the commutation brushes and greatly reduce motor life. Thus, electric motors have inherent limitations.

From a purely theoretical point of view, capacitive devices such as piezoceramic actuators exhibit much more desirable mechanical and electrical characteristics. They have a very efficient coupling of energy from applied charge to mechanical strain, which results in a high bandwidth, a large force output and negligible resistive heating. The actuator stiffness is determined by the modulus of the ceramic material used for the actuator, rather than by an inherently weak magnetic coupling. Because these elements are capacitive in nature, they draw their least current at low or zero rate of displacement. Furthermore, a direct correspondence exists between actuator voltage and resultant position, without the need for commutation. Piezoceramic actuators, however, have historically been limited to extremely low displacement precision applications such as mirror control, ink jet nozzles, ultrasonic medical devices, high frequency audio speakers and miniature valves, where motions of only a few thousandths of an inch are needed.

Piezoceramics are commercially available in a variety of configurations, such as plates, tubes and stacks. Composite actuators, such as bimorphs, can be made by sandwiching a metal shim between two thin piezoceramics which are oppositely poled. When a voltage is applied to the bimorph, one piezoceramic expands while the other contracts, introducing a bending motion and/or bending moment of greatly amplified displacement into the composite element.

Several prior patents have been issued for hybrid devices, wherein electrically actuated elements that change dimension in response to an applied electrical drive signal are used to displace fluid for driving a hydraulic ram. Among such patents are U.S. Pat. No. 3,501,099 of Benson and U.S. Pat. No. 5,055,733 of Eylman. Other patents, such as U.S. Pat. No. 4,995,587 of Alexius show mechanical arrangements for amplifying the displacement so produced. However, to the applicant's knowledge, this prior art has not specifically addressed the particular mechanical properties of piezoelectric elements, other than, for example, their general benefit of electrical actuation and their usual limitation of small actuation displacement. In addition, this art has not achieved constructions which optimize the efficiency of a hybrid actuator, or which substantially outperform a conventional actuator.

Accordingly it would be desirable to provide a hybrid electrohydraulic actuator construction of enhanced electromechanical efficiency and performance characteristics.

SUMMARY OF THE INVENTION

A hybrid actuator, or motor, in accordance with the present invention combines strain actuated and fluid actuated elements to achieve, in a single unit, the advantages of a capacitive actuator, the force and stroke characteristics of a small hydraulic device, and the bandwidth of an electric motor. One embodiment of the actuator produces a displacement on the order of 20–30% of the actuator length, and has a bandwidth of approximately 500 Hz. Briefly, the actuator uses strain actuated piezoceramic elements with a mechanical advantage to magnify the piezoceramic actuation strain, with the mechanical advantage being obtained by displacing fluid to drive a piston. That is, the small piezoceramic displacements are amplified by a hydraulic transmission. The piezoceramic displaces the fluid in a master cylinder that acts on a smaller diameter actuator piston in the same cylinder or a slave cylinder. In preferred embodiments, the piezoceramic elements are shaped and oriented in special housing configurations to maximize a property such as the stroke or volume displacement of the fluid, and the piston may be round or have a shape and dimensions which are optimized based on the housing and actuator geometry. Preferably the actuator is instrumented to provide collocated displacement and load information. In further embodiments, a local feedback loop enhances the accuracy attained in reaching commanded displacements or forces.

In another embodiment of the invention, a hydraulic actuator is configured so as to achieve high bandwidth, large stroke actuation. In a preferred embodiment, devices of the invention comprise a piezoelectric stack actuator having a two stage lever. In yet another embodiment the first stage lever is a mechanical lever, and the second stage lever is a fluid lever.

Solid-state hydraulic actuators of the invention are suited to a variety of applications. The actuator is small compared to an electric motor and dissipates minimal power. It requires low currents to produce significant static loads. Controllers for the device are small and simple, not requiring complicated switching and timing for commutation. The controller can be packaged integrally with the actuator, to provide a modular design. Unlike electric motors which produce a velocity output for a commanded voltage, and require controllers to produce displacement profiles, this solid state hydraulic actuator has a direct correspondence between stroke and voltage, and its response may be programmed with a voltage profile. When instrumented, the actuator provides local information about displacement and applied load and hence lends itself to effective controller designs. A preferred embodiment of the actuator is extremely modular, with no external hydraulic or pneumatic lines, and yields significant stroke and force output for its size. It is also easily scaled to provide larger strokes and/or force outputs as required.

BRIEF DESCRIPTION OF THE DRAWINGS

These and other features of the invention will be understood from the drawings of illustrative embodiments, taken together with a description thereof, wherein:

FIGS. 5, 5A and 5B are views, partly schematic, of a first embodiment of the invention;

FIGS. 6, 6A and 6B are views, partly schematic, of a second embodiment of the invention;

FIGS. 7, 7A and 7B are views, partly schematic, of a third embodiment of the invention;

FIGS. 8, 8A and 8B are views, partly schematic, of a fourth embodiment of the invention;

FIGS. 9, 9A and 9B are views, partly schematic, of a fifth embodiment of the invention;

FIGS. 10, 10A and 10B are views, partly schematic, of a sixth embodiment of the invention;

FIGS. 11, 11A and 11B are views, partly schematic, of a seventh embodiment of the invention;

FIGS. 12 and 12A are views, partly schematic, of an eighth embodiment of the invention;

FIGS. 13, 13A and 13B are views, partly schematic, of a ninth embodiment of the invention;

FIGS. 14, 14A and 14B are views, partly schematic, of a tenth embodiment of the invention;

FIGS. 15, 15A and 15B are views, partly schematic, of an eleventh embodiment of the invention;

FIGS. 16, 16A and 16B are views, partly schematic, of a twelfth embodiment of the invention;

FIGS. 17, 17A and 17B are views, partly schematic, of a thirteenth embodiment of the invention;

FIGS. 18, 18A and 18B are views, partly schematic, of a fourteenth embodiment of the invention;

FIGS. 21, 21A and 21B are views, partly schematic, of a fifteenth embodiment of the invention;

FIGS. 22 and 22A are views, partly schematic, of a sixteenth embodiment of the invention;

FIGS. 23, 23A and 23B are views, partly schematic, of a seventeenth embodiment of the invention;

FIGS. 24, 24A and 24B are views, partly schematic, of an eighteenth embodiment of the invention;

FIGS. 25, 25A and 25B are views, partly schematic, of a nineteenth embodiment of the invention;

DETAILED DESCRIPTION

The invention will be best understood after a brief discussion of prior art motors or actuators, and a theoretical discussion of the actuation characteristics of hybrid actuators.

Figure 1:
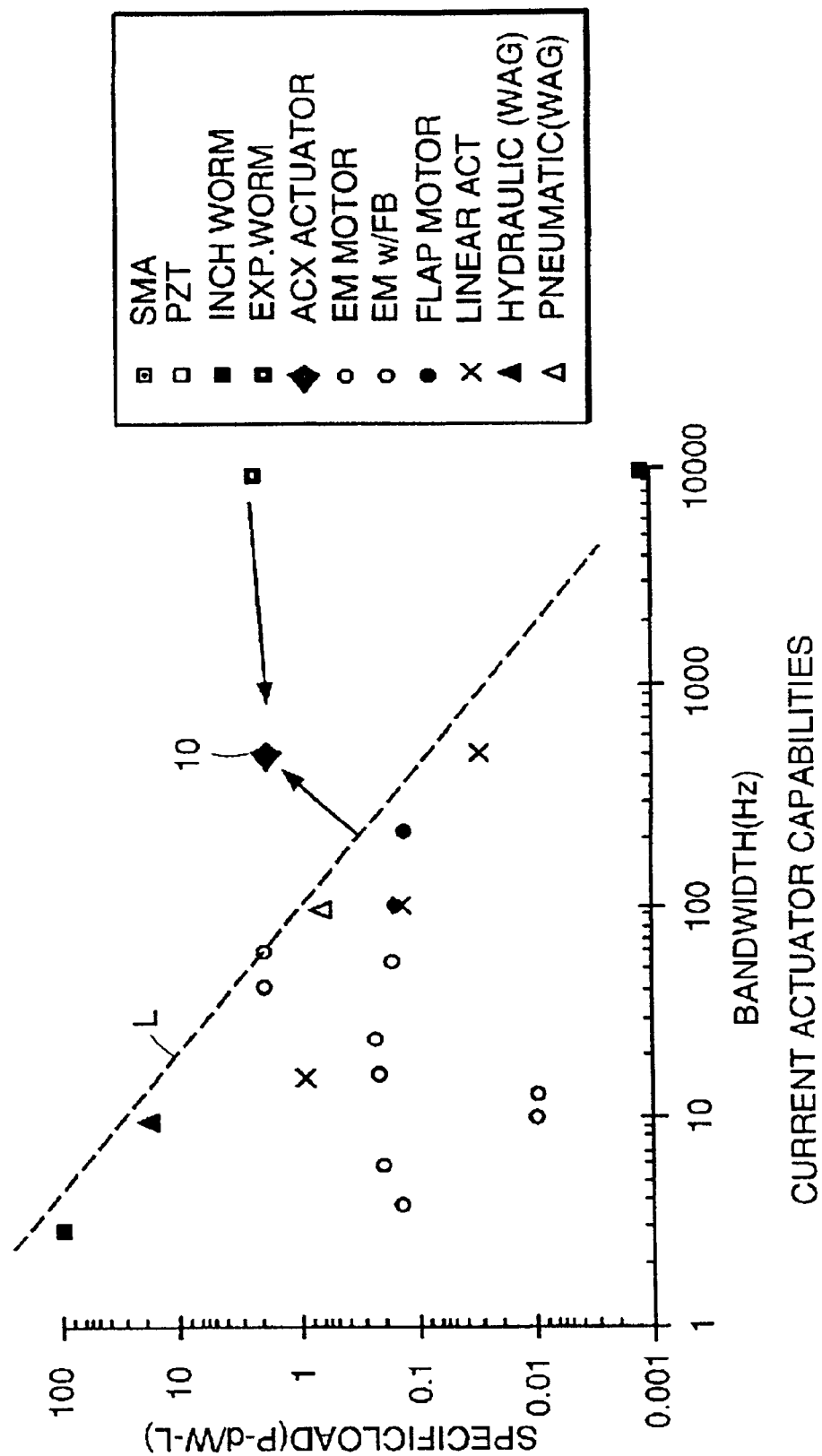
FIG. 1 is a chart of characteristics of actuators of the prior art and of the present invention.

FIG. 1 shows, for a variety of different actuator types, a plot of the specific load of the actuator against its operating bandwidth. Specific load is a performance metric which is the product of the average force produced by the actuator times its average stroke capability scaled by the actuator weight and characteristic length. Hydraulic actuators are shown to have a high specific load but low bandwidth. So are shape memory alloys (SMA), a type of temperature controlled transducer that returns to an initial shape on heating. On the other hand, piezoceramics have very high bandwidth but small stroke capability. Electric motors have significantly less specific load capability than hydraulics, but greater bandwidth. Overall, there is a trade-off, in that actuators with high specific load capability are generally of low bandwidth, and actuators with high bandwidth have relatively low specific load capability. Of the seventeen prior art actuators examined to compile the chart of FIG. 1, all lie below the trade-off line L, and most occupy only a small region of the total range spanned by the chart. By contrast, a representative hybrid motor/actuator 10 is seen to lie well above line L, representing almost an order of magnitude improvement in specific load and in bandwidth, in the highly useful central region of the chart.

The specific constructions for achieving such enhanced performance will be discussed after modeling the behavior of several illustrative constructions of hybrid actuators in accordance with the present invention. Schematics of a few solid-state actuator architectures in accordance with the present invention are shown in FIGS. 2A–2D, and will be discussed below. Other possible configurations and detailed implementations are shown in the FIGURES, which is not a comprehensive list of actuator configurations, but illustrate a number of different embodiments of the invention which applicant has determined to have high expected performance or particular useful characteristics of force, stroke, size or physical shape. In the FIGURES, piezoceramic components are shown shaded, whereas other structural components such as housings, pistons and the like are illustrated by simple outline drawing. The configurations use piezoceramics in a variety of architectures, each within or bordering an oil filled cavity. Further, as will be understood from the following descriptions of a number of representative embodiments, the piezoelectric elements may in many cases constitute all or a major portion of the fluid housing, or body of the device.

As is well known, a voltage applied to a piezoelectric element produces an actuation strain which deflects the piezoceramic element. In all embodiments of the present invention, this deflection creates a fluid pressure which acts against a piston. Depending on the stiffness against which the actuator pushes, this fluid pressure may produce a force, or the fluid pressure may simply lead to a fluid displacement if the piston is free to move unhindered. In general, the small piezoceramic displacements are amplified by the hydraulic transmission, that is by the displaced hydraulic fluid acting on the piston structure.

As shown in FIGS. 2A–2D, different geometries of the basic elements are employed to form four configurations A–D having conceptually different properties. Configuration A uses bimorphs which are each pinned (i.e., fixed) at the piston end and rear of the actuator, and are free to bulge on the sides. When a voltage is applied, the bimorphs flex out, effectively bowing the broad faces inwardly to squeeze the oil filled cavity. Configuration B uses a piezoceramic tube which is preferably poled to constrict in the radial direction when a voltage is applied, reducing the cross sectional area of the oil filled center. Configuration C uses a piezoceramic stack acting against an oil filled cavity. Configuration D uses opposed plates, sealed at the edges, with a piezoceramic stack at each corner. The stacks are actuated to push the plates closer together and force oil out of the cavity.

In each case a piston element P is shown having a relatively small cross-sectional area perpendicular to its direction of motion. This may be understood in a rough sense as enhancing the stroke of the device. In addition, the piezoelectric elements are preferably specially shaped and poled, as in the embodiments of Configurations A and B, to enhance fluid displacement with good response characteristics.

Applicant has developed a model to predict the anticipated stroke capability of the configuration shown in FIG. 2A as a function of actuator geometry and piezoceramic constants, which will now be discussed in detail for a better understanding of the novel constructions of the present invention.

Figures 3, 4:
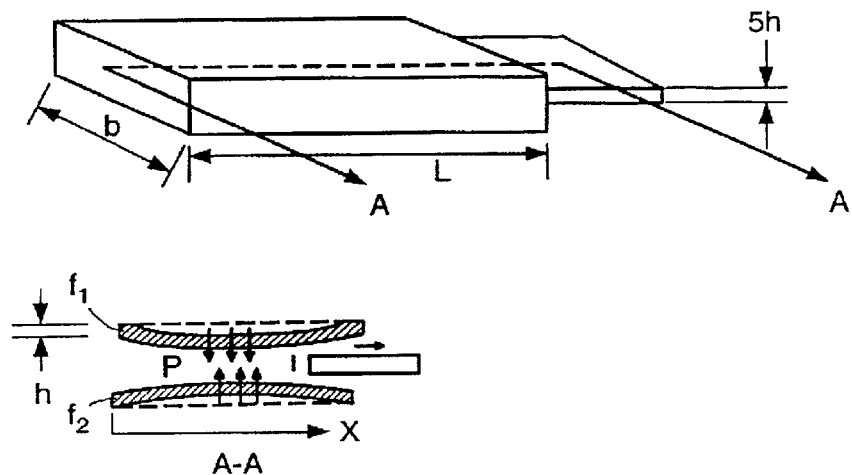
FIG. 3 shows an embodiment with the hybrid architecture of FIG. 2A having its relevant dimensions labeled for purposes of modeling.
FIG. 4 is a table of stroke as a function of the labeled actuator parameters.

FIG. 3 shows the actuator height a, width b, and length L of a rectangular sandwich-shaped squeezer type hybrid actuator. The upper and lower faces, $f_1$ and $f_2$, are each formed by a bimorph having thickness h, and the piston has thickness 5h. The displacement, w, of the bimorph at any position x along the length of the actuator is given by $$w = \frac{1}{2}\kappa(x^2 - xL) \quad (1)$$

where κ is the local curvature of the bimorph. For a thin shim, the curvature may be accurately expressed as a function of the local strain ε.

$$\kappa = \frac{2\varepsilon}{h} \quad (2)$$

whence $$w = \frac{\varepsilon}{h}(x^2 - xL) \quad (3)$$

Integrating this displacement over the length and width of the bimorph yields a volume V which is equivalent to the volume of oil displaced by the flexure of one bimorph, i.e., by actuation of one side of the fluid housing:

$$V = \int_0^L bw\,dx = -\frac{1}{6}\frac{\varepsilon}{h}L^3 b \quad (4)$$

If this volume of oil drives a piston of width b, and height 5h, the piston travel ΔL when both bimorphs are actuated is obtained by equating the volume displaced by the piston's travel to the volume of oil displaced by the flexure of the two bimorphs. The travel is given by:

$$\Delta L = \frac{1}{15}\frac{\varepsilon}{h^2}L^3 \quad (5)$$

or, as percent of the overall length of the actuator, $$\frac{\Delta L}{L} = \frac{1}{15}\frac{\varepsilon}{h^2}L^2 \quad (6)$$

Assuming a typical value of 450 ppm strain for piezoceramics in a $d_{31}$ configuration, piston travel as a function of the actuator geometries is readily predicted. FIG. 4 shows the stroke which is calculated for two standard catalog piezo components. It will be seen that the available stroke from such an actuator is quite large. With the thinner actuator of the two, the stroke increases dramatically, but less force is produced. Applicant's analysis performed to predict the forces produced by such an actuator yields preliminary estimates for these forces on the order of two pounds, which is a magnitude suitable for a great number of practical actuator applications, including applications such as driving gate valves, operating low frequency (woofer or sub-woofer) audio speakers, and various indicating or mechanical switching operations.

Figure 2:
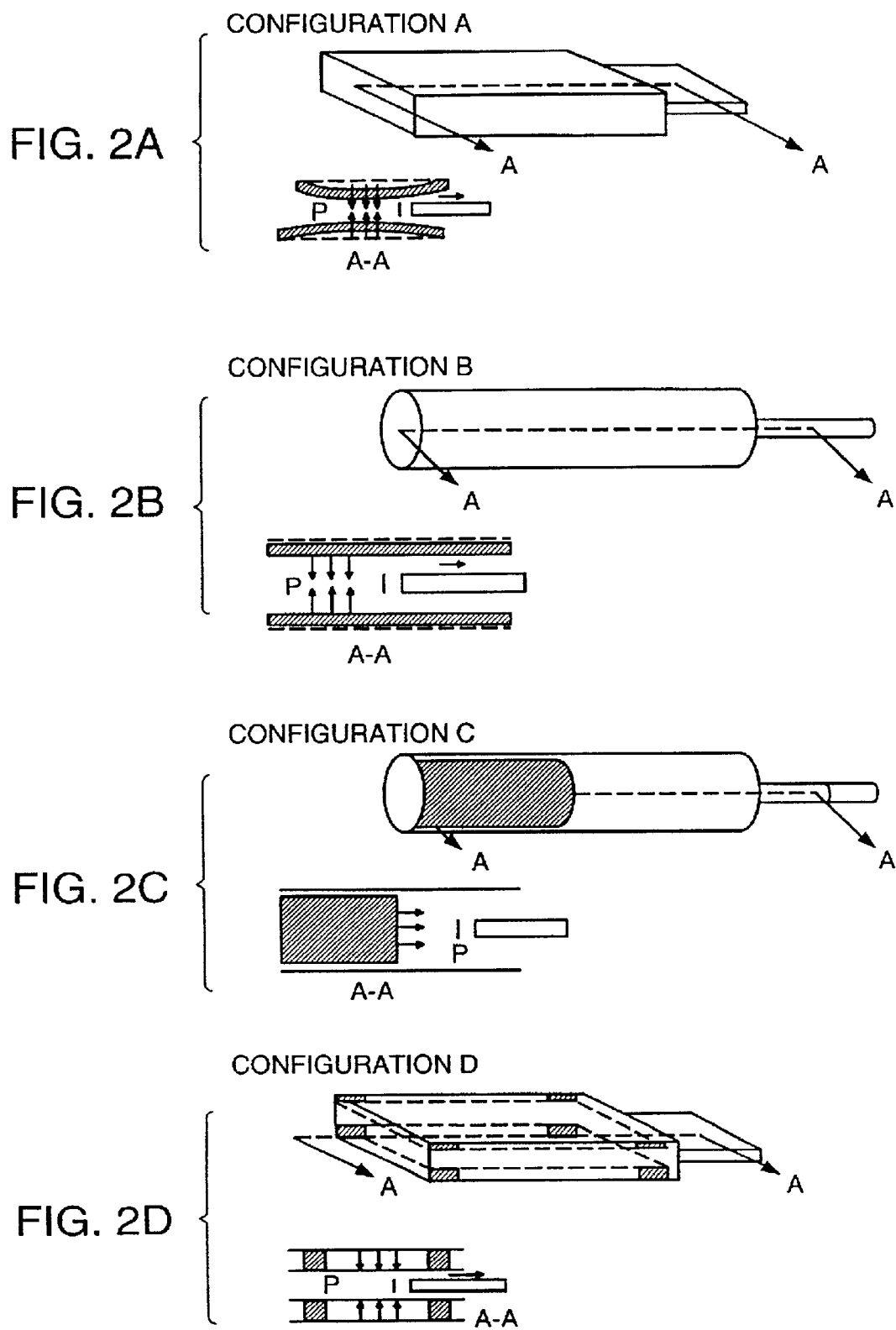
FIGS. 2A–2D illustrate four architectures for a hybrid piezoelectric actuator in accordance with the present invention.

In a similar manner, models are constructed to predict the force and stroke capabilities of the three other architectures of hybrid actuators shown in FIGS. 2B–2D. Using the published characteristics of a few commercially available piezoelectric cylinders, and stacks of discs or annuli, the models combine electrical, mechanical and hydraulic properties of the system components such that they predict piston deflection when a voltage is applied, or operating as transducers, they predict the induced piezoceramic voltage when the piston is deflected. The losses to be expected from motion of the viscous oil are evaluated analytically, and can be minimized, for the designs shown in FIGS. 2A–2D, by constructions which have the piezoelectric elements directly constitute or act on one or more walls of the piston housing, rather than acting in a separate fluid displacement chamber.

This modeling predicts strokes on the order of thirty percent of actuator length, with a bandwidth of 500 hz. Moreover, the actuators are readily scaled, so that they may be used for diverse applications, ranging from such medium-scale movements as animating puppets or mannequins, to micro-applications such as operating a shutter assembly of a camera.

Figure 3A:
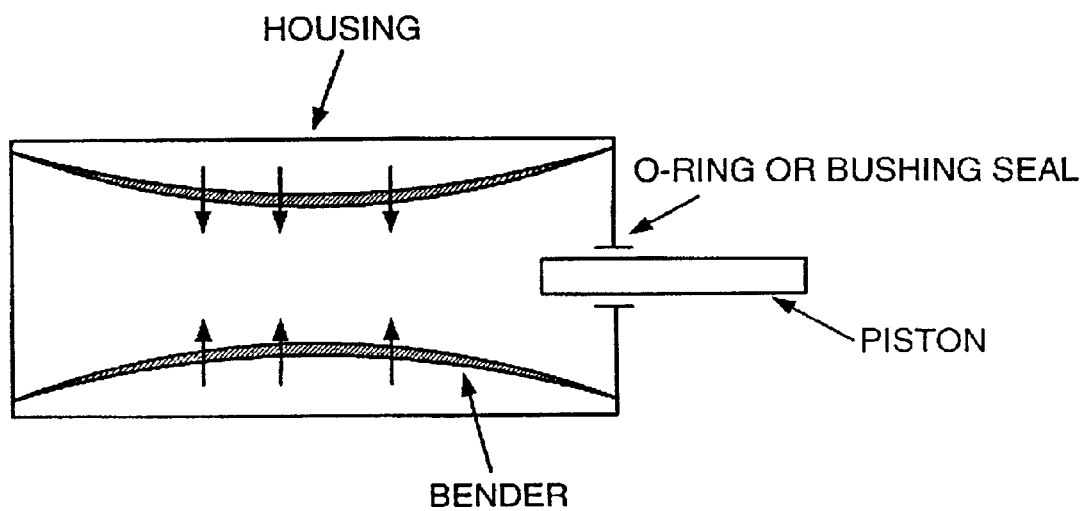
FIG. 3A shows further details of an embodiment with the architecture of FIG. 2A.

With regard to details of construction of the actuators in accordance with the present invention, applicant has found certain approaches to appear more reliable, in terms of effective maintenance-free operation, in common with all constructions described below. Among such details it is necessary to provide a seal about the piston assuring that fluid does not leak from within. This is preferably accomplished using either a linear bushing or bearing through which the piston passes, or using an O-ring or scraper arrangement about the piston. For low force applications, a diaphragm seal rather than an O-ring or other seal frictionally contacting the piston is preferred. FIG. 3A illustrates the physical structure of the sandwich-shaped squeezer actuator schematically shown in FIG. 3. Each of the piezobender elements is mounted with both ends fixedly secured to a surrounding (rectangular or cylindrical) housing, and the housing secures an O-ring or bushing seal, through which the piston rod slides.

It is also in general necessary to ensure that arcing of the actuator electrodes does not occur through the surrounding fluid or oil. One approach to this problem is to employ a robust but thin elastic insulating layer such as a polyurethane coating over the piezoceramic elements. The polyurethane is electrically insulating, and, being considerably more elastic than the piezoceramic, does not impede its motion. It is also necessary to connect the electrodes to the piezoceramic elements. In general each element will undergo a relatively small motion and it is therefore feasible to employ electrical wire feed throughs through the actuator housing to connect, via a short pigtail, to a metallized electrode surface of the actuator. In making the electrode contacts, it is also desirable to avoid elements such as sharp spring loaded tabs which might introduce stress concentration on the electrode surfaces of the actuators. Two way travel of the actuator is achieved in some embodiments with a return spring design, and in others is achieved with a dual action actuator having two similar piezoceramic mechanisms pushing oil into two separate chambers located on either side of the piston rod. The return spring construction will generally reduce the overall stroke capability of the actuator, while the use of dual piezoceramic mechanisms and dual oil chambers would complicate and raise the cost of overall design and fabrication. In preferred embodiments, applicant achieves a bidirectional actuator by using step or tapered piston bodies in a single fluid chamber, with the bodies extending out of the fluid chamber at each end. The actuator is preferably biased in a mid position to be able to either increase or decrease its volume upon actuation. Preferably, various additional steps are also taken to avoid delamination or cracking of the piezoceramic elements, such as might occur with bimorphs, tubes, stacks or any elements that extend for any substantial length in a direction, or are subjected to high pressure pulses in the fluid surroundings.

In controlling both the shape and the disposition of the strain actuated elements within the fluid system, an actuator sensor or motor according to the present invention may be configured to optimize any of the operating parameters and, in some cases, several of the parameters for specialized tasks. The great bandwidth achieved, and efficiency have each been noted above. However, it is also possible to optimize or enhance the stroke for actuating mechanical displays or objects and motion amplification; or to optimize or enhance the force produced by the device, a trait which is useful in a specialized feedback system for controlling small localized displacements, or for controlling instantaneous pressure in a fluid system such as a braking system; or to optimize or enhance the motion or force signal resolution for sensing and amplification of motion or force.

These desirable traits will be understood with reference to the following discussions of illustrative embodiments. In each of the FIGS. 5 through 22, three views are shown, a first, conceptual, view labeled with the numeral, e.g., FIG. 5, followed by a FIG. 5A and a FIG. 5B. The "A" view represents an end view taken along the direction of the axis of the piston actuation for a rectangular or square embodiment, whereas the "B" view represents a similar view of a cylindrical embodiment. The first view in each case is a section taken along the axis of piston movement, which, as explained further below, may be either aligned with or aligned perpendicular to the axis of actuation of the elements involved.

Taking FIG. 5 for an illustrative example, the FIGURE shows a section through an actuator housing 10 having a piston 12 and filled with a fluid 13. An actuating body 14 seals the end of the housing, and as described above is actuated to induce local strain which causes a change in its dimensions, i.e., a change in its length, width, thickness or the like. In the FIGURES, an isosceles triangle is placed on the actuator element to indicate the poling direction of the element, denoted P, while a line through the triangle indicates the actuation axis or direction of principal movement of the element when actuated. Thus, briefly looking ahead, the configurations shown in FIGS. 5 and 6 are actuated along $D_{31}$, whereas the configurations shown in FIGS. 7 and 8 are actuated along $D_{33}$. Returning to FIG. 5, the actuating body 14 closes the end of the housing, and is actuated to expand lengthwise across the housing ($D_{31}$) so that it flexes forward in the center displacing an amount of fluid swept by the diaphragm-like bending displacement of the element. As shown in FIGS. 5A and 5B, the housing may be either rectangular or circular in cross-section. Similarly, the piston may be of a rectangular or circular cross-section; however, for purposes of economic bearing and seal fabrication, a circular cross-section is generally preferred for the piston shaft.

FIG. 6 shows a somewhat similar embodiment which differs in having a movable pusher panel 15 displaced by the diaphragm. In this case, a greater displacement is obtained since panel 15 is moved by the center or maximum displacement of the diaphragm. A plurality of springs, shown schematically, returns the panel to its zero or resting position when actuation is discontinued. This return mechanism is desirable when the actuator is configured for relatively small force applications, in which frictional hysteresis might otherwise prevent reliable return.

FIG. 7 shows a related embodiment, wherein the movable panel is replaced by a bendable panel 16, which may for instance, take the form of a hard rubber diaphragm. Bendable panel 16 is fastened about its circumference to the housing, while its center is free to flex forwardly. The panel is actuated by a stack 17 of strain actuating elements (e.g., piezoceramic discs) which are preferably actuated for extension in the $D_{33}$ direction. The stack may consist of square, round or other planar elements, with a multiplication or amplification of extension obtained by stacking a plurality of elements one on top of the other.

The embodiment shown in FIG. 8 eliminates the panel and relies on a stack 17 of piezoelectric plates residing directly in the body of fluid. In this embodiment, again, the stack is actuated in the $D_{33}$ direction. Since it resides directly in the fluid, the expansion in the axial direction is somewhat offset by a contraction in the in-plane direction of each element. That is, the change in length times the cross-sectional area will displace fluid, but this displacement is partially offset by a decrease in fluid displaced at the edges of the stack due to coupling between the directions of strain introduced in the device. This decrease will be proportional to the perimeter times the height times the change in cross-sectional dimension. As noted above, these latter two embodiments are actuated in the $D_{33}$ direction, so the $D_{31}$ change is relatively slight. However, to optimize piston displacements, some form of surface seal across the top of the stack to the housing wall is preferred, to prevent fluid from reaching the side region. Furthermore, the area of each plate in the stack 17 is preferably a substantial portion of the cross-sectional area of the fluid chamber.

A different situation is shown in FIG. 9, wherein the stack 17 is replaced by a thin shell 18 which, as in the embodiment of FIG. 6, supports a fixed plate 15. In this case, the thin shell may be made of a piezoceramic cylinder, or a series of plates which are fastened together and sealed. As illustrated, actuation is by extension in the $D_{21}$ direction. As before, rectangular or circular embodiments are possible.

Variations of these basic approaches are also contemplated by the invention. For example the embodiment of FIG. 6, in which a movable stiff panel 15 is pushed by a bender element, is modified in a straight-forward way by replacing the bender with a stack 17 that is activated to lengthen and push the panel. All of these described embodiments may be characterized in having actuable strain elements for moving a piston along the direction of actuation. The basic elements are quite flexible in design, and similar units may be placed not just at the bottom of the housing, but also at the top surrounding the cylinder so as to displace up to twice as much fluid with the same actuating signal. In all of the foregoing constructions, fluid displacement is axial, in the direction of piston travel, so that losses from hydrodynamic effects due to movement of the displaced fluid are minimal. However, the invention is not restricted to such embodiments, but also includes constructions wherein fluid displacement (or more precisely, volumetric expansion of the displacing element) occurs in a direction perpendicular to the direction of piston travel.

FIG. 10 shows such an embodiment, wherein the external lateral walls forming a fluid-bounding structure are formed by a thin strain-actuated shell 9 such as a cylinder or a series of plates. In this case polling is radial, and actuation is preferably along the radial direction in the $D_{31}$ sense so that when the element is actuated it squeezes or constricts radially to move the piston 2. If the external walls are made of separate plates, a single plate, a pair of opposed plates or all four sides may be made of the strain-actuated elements.

FIG. 11 shows a hybrid motor wherein the strain actuators move in a direction perpendicular to that of piston motion. In this case, the actuators 11 are piezobenders actuated in the $D_{31}$ direction to flex inwardly along their lengths. This embodiment is preferably implemented with a pair of opposed sides in a more or less rectangular configuration with a piston having a rectangular or oblong cross-section. That is, the piston has a greater width in a direction normal to motion of the actuator, than in a direction parallel to motion of the actuator. This allows a thin flat "sandwich" aspect to the housing. FIGS. 12 and 13 show constructions for this perpendicularly actuated embodiment which bear the same relationship to FIG. 11 as the constructions of FIGS. 6 and 7 do to that of FIG. 5. Specifically, FIG. 12 shows spring-loaded pusher plates 5 which are displaced in accordance with the maximum displacement of the center portion of the piezobenders 11. FIG. 13 shows a bendable panel 13, analogous to the stiff diaphragm-like panel 16 of FIG. 7, having its center displaced perpendicularly to the piston axis by a stack of strain actuators 12.

Among the foregoing constructions, that of FIG. 11 employing bending walls to displace fluid will be appreciated by those skilled in piezoceramics to displace a relatively large amount of fluid upon actuation. This property may be further enhanced by the embodiment shown in FIG. 14, wherein the fluid chamber is annular, and the inside bounding walls 11 and outside bounding walls 11 are each formed of a strain-actuated bending element. In this case, the inside walls flex outwardly while the outside walls flex inwardly; the piston 14 is formed as an annular or U-shaped body (for the cylindrical or rectangular configurations respectively) so that a full circumference (cylindrical configuration) or a pair of legs (rectangular configuration) are acted upon between the respective sets or regions of the inner and outer walls.

FIG. 15 shows an embodiment wherein plates 7 are actuated through their thickness in a direction perpendicular to the axis of the piston to displace fluid. This construction advantageously provides a large fluid displacement with only small compensating coupled shrinkage at the end of plates.

FIG. 16 shows a similar arrangement wherein pusher plates 5 are supported by plate or cylinder strain actuators 8. The latter are polled through their thickness, and actuated in the $D_{31}$ direction.

FIG. 17 shows a similar arrangement but supported by stacks actuated in the $D_{33}$ direction. In each of these latter two embodiments, large displacements are obtained with only small coupled counter effects at the end supports. Coupled shrinkage effects are especially small in the embodiments of FIG. 16 and 17, which do not involve large continuous strain elements, and which use pusher plates to amplify the fluid volume displaced. The region below each pusher plate is sealed against fluid communication with the rest of the housing.

FIG. 18 shows a two chamber embodiment (rectangular) or annular embodiment (cylindrical configuration) wherein inner and outer walls are each poled and actuated in their thickness dimension. Illustratively, an end plate 16 closes the ends of the fluid housing formed by the strain elements, and slidably supports the piston 14. In this embodiment, and in other embodiments employing cylinders described herein, stroke is greatly enhanced by virtue of the fact that a thickness expansion displacing fluid is coupled by Poisson coupling to a decrease in cylinder or plate length. This draws the end cap in, further displacing fluid from a length contraction as well as from the width expansion. Thus both of the two strain-induced motions of the element additively displace fluid resulting in an enhanced stroke. A similar result is achieved with a simple cylindrical embodiment using a piezoceramic cylinder polled across its thickness.

Figure 19:
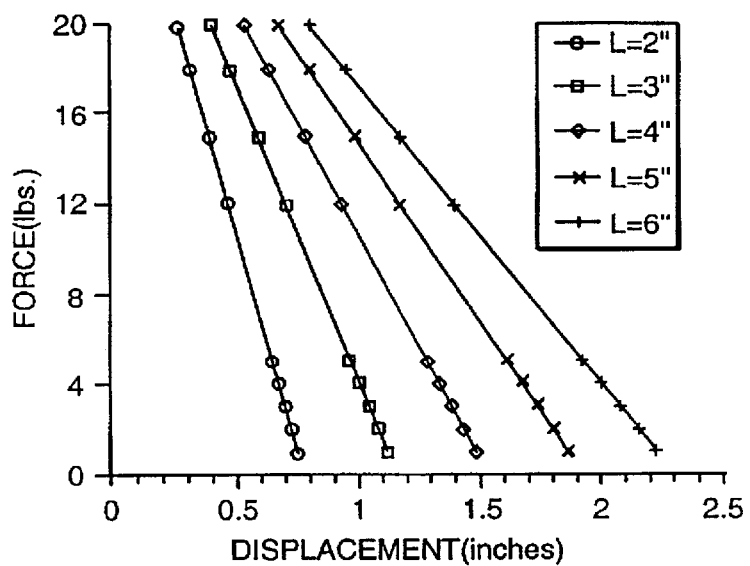
FIGS. 19 and 19A illustrate force versus displacement curves for a variety of actuators with cylindrical elements, and with a stack of elements, respectively.

Applicant has modeled the force and displacement available from a simple half-inch diameter actuator with a 1/32-inch diameter piston rod, the results being shown in FIG. 19. As illustrated, a simple 3-inch long piezoceramic cylinder provides piston displacement of approximately one inch with forces up to twenty pounds. Longer cylinders provide longer stroke, and a higher force profile over extended portions of the stroke.

In general, the piston diameter will determine the actuator blocked force, with larger pistons providing larger blocked forces, so that either large stroke or large force may be obtained. When frequency of actuation becomes a concern, a minimum force requirement is set by the mass and bandwidth specifications, since a specific force is needed to accelerate a given mass at a particular frequency, where the force $F=m\,A\,\Omega^2$. In general, all of the foregoing embodiments have the property that very low electrical current levels generate significant static loads. Furthermore, controllers for the actuators can be small and simple since they require no complicated power or mechanical switching, or timing for commutation.

Figures 19A, 19B:
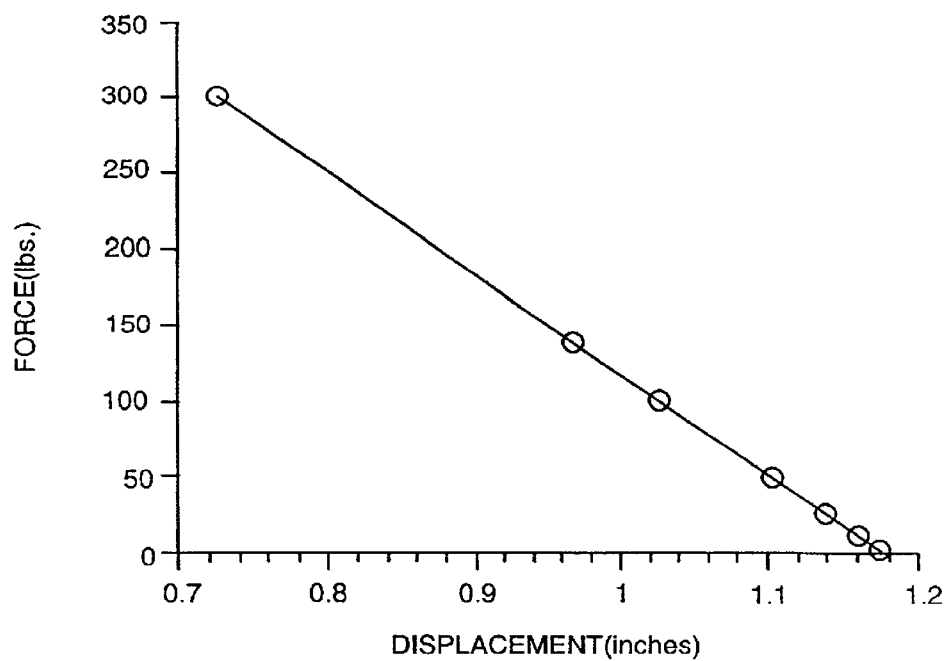
FIG. 19B is a table of physical characteristics of piezoelectric materials.

FIG. 19A shows the force versus displacement characteristics of another embodiment, employing a stack of piezoelectrically actuated plates. Here, a three and one-half inch diameter stack of disc elements, six inches tall, was assumed. As shown, forces of over three hundred pounds over a half-inch extension, and one hundred pounds at a one-inch extension were obtained, with a sharp drop-off above one inch. Thus, high force, high displacement output is achieved in this embodiment, although the relative displacement as a function of actuator size, is less than for the embodiment discussed earlier.

These characteristics may be varied somewhat by the selection of appropriate piezoelectric elements. In general, the strength and stiffness will be important for hybrid devices wherein the piezoelectric element forms the device housing, while properties such as actuation bandwidth may be a primary consideration for devices that require high frequency or short response actuation characteristics. FIG. 19B shows the physical characteristics of a number of piezoelectric materials including the piezoceramic PZT, lead magnesium niobate (PMN), the polymer Terfenol, and shape memory alloy (PMA). PZT actuators provide good overall characteristics for high bandwidth actuators, while at the other extreme SMA actuators may provide high strength, but at the price of very low bandwidth.

Figure 20:
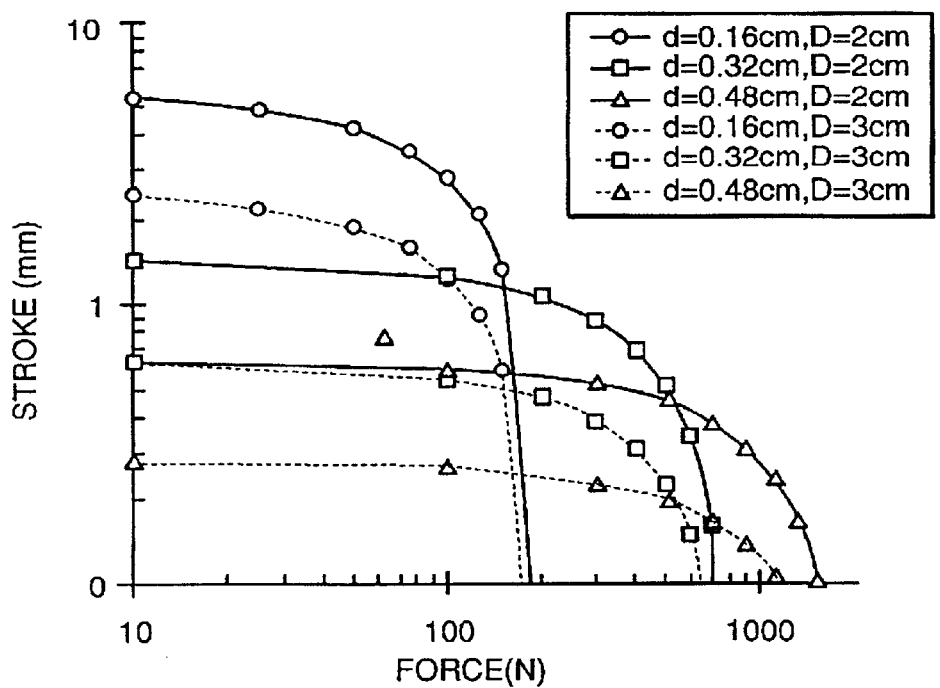
FIG. 20 illustrates force versus stroke characteristics for the embodiment of FIG. 8.

FIG. 20 shows design curves for a hybrid linear displacement actuator of the type shown in FIG. 8. The curve illustrates the force versus stroke characteristics for six different hybrid actuators having cylindrical casing diameters of either 2.0 or 3.0 centimeters, and three different piston diameters. The length of each actuator is assumed fixed at two centimeters. As illustrated, strokes of approximately 30% of the actuator length are obtained for the smallest piston, and approximately 5% for the intermediate size piston, with good force characteristics.

FIGS. 21 through 25 illustrate further embodiments of the invention with different poling or actuation arrangements in actuators of rectangular or cylindrical cross-section, and with simple or annular chambers. As before, poling and actuation directions are indicated schematically.

Figure 26:
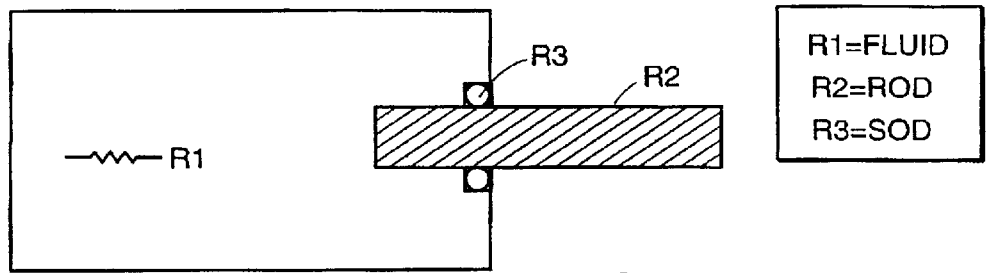
FIGS. 26 and 27 illustrate single- and double-ended actuators, respectively, with spring return.
Figure 27:
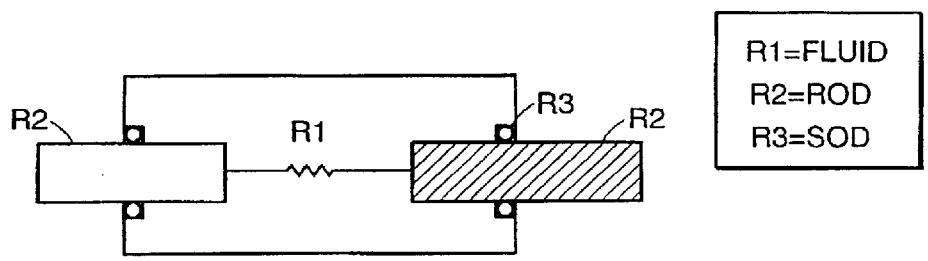

In addition to the foregoing constructions, actuators in accordance with the present invention may be configured as single acting, double acting or differentially double acting cylinders as illustrated in FIGS. 26 through 29. A representative single acting cylinder has a piston extending out one end of the housing, preferably returned via a constant force spring as shown in FIG. 26. FIG. 27 illustrates an embodiment with a piston extending at each end out of a single housing. In such embodiments, the pistons are preferably tied together with a common constant force spring and each is equipped with a limit stop to prevent excessive extension. In each case, the spring bias may be replaced by electrically biasing the piezo elements into a mid-operating region. Since the cylinder is hydraulically full, motion of the piston then tracks increase or decrease in fluid volume.

Figure 28:
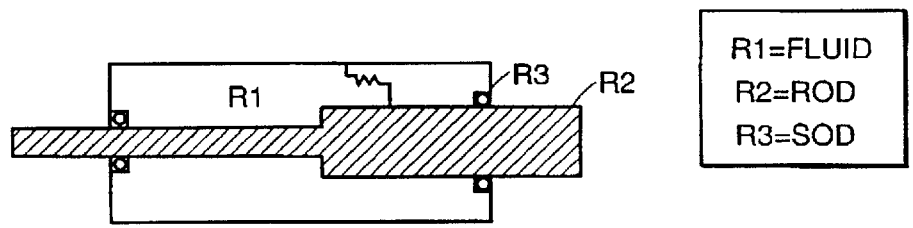
FIGS. 28 and 29 illustrate two embodiments of double-ended actuators.
Figure 29:
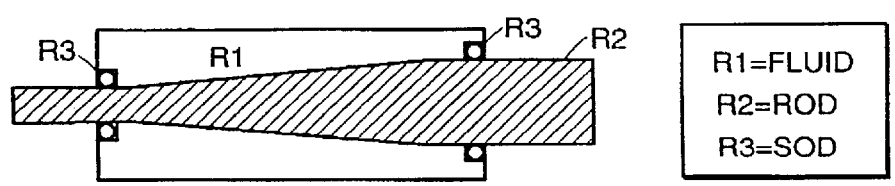

FIGS. 28 and 29 show embodiments wherein a single piston passes entirely through the housing, to extend from either end depending on the volume of fluid displaced. As shown in FIG. 28, the piston is a step piston having a small diameter at one end, a large diameter at the other end and a step in an intermediate portion that moves within the fluid housing. In the embodiment shown in FIG. 29, the contour of the piston within the fluid housing is a taper rather than a step. In these two embodiments, decrease of the volume available for fluid moves the piston to the right, while increase of the available volume drives the piston assembly to the left.

It will be appreciated that the foregoing embodiments have been described generally with respect to hybrid systems employing strain-actuated elements in the form of stacks, plates or cylinders that either constitute the fluid housing, or act on pusher plates constituting the fluid housing, thus providing a very lightweight construction of hydromechanical simplicity. In general, the piezoceramic elements produce a force or displacement characteristic that is directly related to applied voltage for a given actuator, and therefore these devices may be driven and controlled in a quite simple manner with microprocessor controllers using simple circuit interface elements for amplification. They thus offer a versatile approach to many production line and manufacturing applications previously tied to pneumatic actuator technology. They further offer myriad uses in areas as diverse as medical products, window displays, puppets, motor vehicle subsystems, locks, and numerous signaling or control applications.

Figure 30:
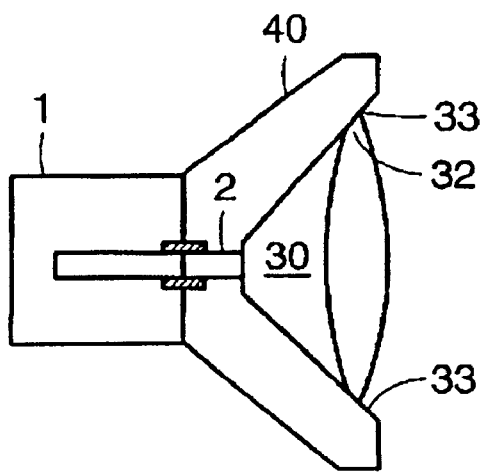
FIG. 30 illustrates an embodiment of a sub-woofer in accordance with the invention.

The compact housings of such hybrid actuators allow them to be readily integrated into or attached to various actuated devices. For example, one area in which the hybrid actuator of the present invention offers a substantial improvement in operational characteristics is as a low-frequency audio speaker, a woofer or sub-woofer. In such a device, a fluid reservoir with a thin cylindrical piston as shown, for example, in FIGS. 24 and 24B may attach directly to the apex of a speaker cone, or even to a flat plate, directly replacing the magnet and coil of a conventional speaker assembly. Such a hybrid speaker driver may achieve high efficiency, large displacement, linear motions (e.g., of one to five inches) at frequencies from DC to several hundred hz or more, with an exceptionally flat frequency response. Such a sub-woofer 30 is shown in FIG. 30. As shown, a hybrid actuator 1 as shown in any of the foregoing FIGURES has its piston 2 connected to drive one end of a large plate, illustrated as a speaker cone 30, the outer perimeter 32 of which is suspended, by springs or elastic material 33 from a frame 40 to which the actuator 1 is rigidly attached. Operation of the actuator thus drives an extended air column defined by the large diameter cone 30.

Also contemplated by the invention is an embodiment of a levered piezoelectric stack actuator comprising:
1) Stack
2) Mechanical Stage Lever
3) Fluid Stage Lever
4) Drive Electronics
5) Sensor and Control Electronics(optional)

In order to get significant strain in the piezoelectric stack, a peak field of 40–50 V/mil is required. This is achievable by having thin plates at a low voltage or thick plates at a high voltage.

High lever ratios are more sensitive to tolerance and are typically less linear through the travel. For example, in one embodiment, the maximum mechanical stage lever ratio may be set to 15:1, and the maximum fluid lever may be set at 30:1.

The amount of stored energy, $E_{stored}$, is:

$$\frac{1}{2}CV^2$$

where C is the capacitance and V is the applied voltage. For example, if the voltage, V, is set at 500V, the capacitance is constrained by the required work for the given application and the efficiency of the actuator $$(\varepsilon = \frac{Work}{E_{stored}}, \text{ where } Work = \frac{F_{blocked} Y_{free}}{2}).$$

Note that for a given application, once the voltage, capacitance and bandwidth are set, the amplifier requirements are fixed.

A high blocked stiffness is required to make an efficient actuator. Efficiency is defined as the percentage of the total work that the stack can provide that is provided at the output of the lever. A soft lever will prevent a large force from being transmitted. Inversely, this also points to the fact that a long narrow stack would have a higher efficiency for a fixed lever stiffness.

In another embodiment, a levered piezoelectric stack actuator may comprise a mechanical lever. Performance of a mechanical lever can be broken down into the following components:
1) Maximum lever ratio: Levers have limited lever ratios based on, for example, tolerance of parts or stress.
2) Blocked stiffness: The stiffness of the lever when the output is blocked. This parameter is very important for delivering force.
3) Free stiffness: The stiffness of the lever when the output is free. This stiffness is parasitic. A high free stiffness will limit the free stroke.
4) Parasitic forces: Forces such as friction that resist motion and reduce output force and stroke.
5) Linear travel: As the lever moves the lever ratio may change causing non-linear output for a linear input displacement.

6) Sensitivity: This parameter is the measure of how lever performance will change based on tolerances from part to part.
7) Bi-directional: Some levers can only work in one direction: Push or Pull. It is favorable to work in both directions.
8) Modal mass: High modal mass will reduce bandwidth capabilities. EXAMPLE 1

Flexure Lever

Figure 34:
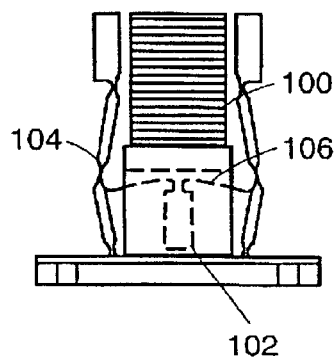
FIG. 34 illustrates an embodiment of a flexure lever design in accordance with the invention.

FIG. 34 shows an embodiment of a flexure lever for a levered piezoelectric stack actuator in accordance with the invention. The flexure lever is a two stage linkage device that provides a very compact, low weight design. The input side of the flexure is the top plate. The stack (100) sits on a table that straddles the output piston (102) of the flexure. The stack (100) applies a force to the input side of the flexure which straightens out the sides of the flexure. The first stage linkage (104) comprises the two sides of the flexure. The second stage linkage (106) comprises the two middle linkages. The straightening of the first stage linkage pushes in on the second stage linkage which in turn pushes the hinge between the two middle linkages up. The output piston (102) is attached to the middle hinge.

In general, a flexure lever will have a relatively high blocked stiffness because the linkages are primarily in tension or compression. The only bending loss is in the top plate and the base plate. These plates can be made thick and as short as possible to reduce the compliance. The fact that the flexure is a spring means that it inherently will have a free stiffness which will reduce the output stroke. The benefit of having some free stiffness is that a return spring is not necessary since the flexure will act as a return spring. Additionally, pre-loading of the stack can be accomplished easily by adjusting the tension in the flexure with set-screws.

The linearity of the flexure should be excellent because the non-linearity caused by the change of link angles through the stroke is opposite in the two stages and this cancels out the non-linearity. As the first stage straightens out, the reduction in the linkage angle causes an increase in the lever ratio. At the same time, the second stage linkage angle increases which reduces the second stage lever ratio.

Since the lever ratio is related to the angles of the flexure, tolerance limits on the linkage angles drive the variability from part to part. Reasonable tolerance limits restrict the maximum lever ratios to values lower than those achievable with the wedge-roller. However, based on tolerances from the manufacturers, lever ratios from ten to twelve should be achievable.

The flexure lever is very light and very compact. Specifically, this lever lends itself to the selected valve application since the aspect ratio of the package is similar to the solenoids being replaced.

EXAMPLE 2

Bench-Top Flexure Lever

In one embodiment, a bench-top flexure lever assembly comprises a one piece steel flexure, a stack support table, and a pre-load plate. These components were analyzed and designed, and components were fabricated. The flexure lever was tested on its own and assembled with piezoelectric stacks.

In the flexure lever design the lever itself is the major component that needed to be analyzed and designed. The table and pre-load plate were simple parts with very little analysis required. The flexure lever had the following parameters to define:

1) Material
2) Linkage lengths
3) Linkage angles
4) Linkage thicknesses
5) Flexure lengths
6) Flexure thicknesses The goals in designing the flexure lever were infinite life, high blocked stiffness, low free stiffness, and low modal mass.

A 17-4 PH stainless steel was selected because of its high endurance limit, high modulus of elasticity, and its ability to be machined by standard methods. Production parts could be made of cast stainless steel with comparable properties.

Figure 32:
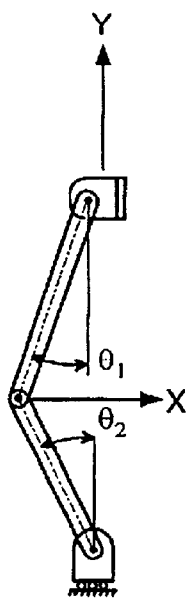
FIGS. 32 and 33 show linkages useful in an embodiment of a flexure lever design in accordance with the invention.

The lever ratio of the flexure was analyzed by breaking the flexure into two separate linkages. The first linkage is made up of the four outside links. Since there is symmetry about the centerline of the flexure, this linkage can be modeled as one linkage with a rolling constraint at the top, as shown in FIG. 32, and the top can only move vertically.

The ratio of axial motion (X) to the input motion (Y) can be calculated by the following equation:

$$\frac{dX}{dY} = \frac{1}{\tan(\phi_1) + \tan(\phi_2)} \quad (14)$$

Figure 33:
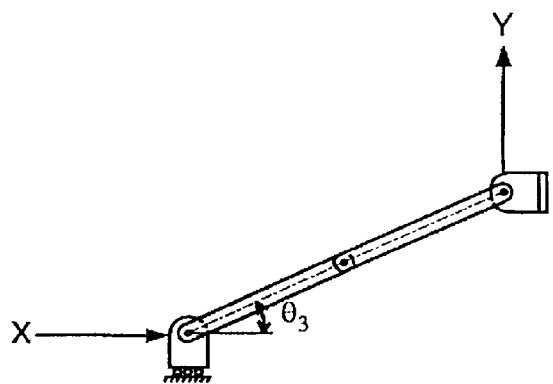

The second stage linkage is made up of the two middle links, as shown in FIG. 33. Since the second stage is also symmetric about the centerline, it too can be modeled as one linkage with a sliding constraint in the middle, and the middle hinge can only move vertically. Since the outside of the linkage is attached to the middle hinge of the first linkage, it is constrained to move only laterally.

The ratio of output to input can be calculated by the following equation:

$$\frac{dY_{out}}{dX} = \cot(\phi_3) \quad (15)$$

The product of the two lever ratios is the total lever ratio.

The bench-top angles were set to give equal lever ratios in each stage. In this way, the sensitivity of the lever was optimized. Small changes in the angles would have little effect on the lever ratio. Since the first stage lever ratio increases as Y increases, and the second stage lever ratio decreases when X increases, the non-linearity in the two stages cancel. To demonstrate this point, the lever ratio error was plotted as a function of output displacement. The result, is a 3.8% reduction in the lever ratio over the expected displacement of the actuator.

The individual angles were also selected based on fitting the lever around the existing bench-top stacks. A U shaped top was placed around the top of the stack to make the linkages equal in size.

The flexure thickness was set to 0.020"—the minimum recommended thickness from the manufacturer. With the initial sizings, several finite element analysis (FEA) runs were completed. The linkage thickness and flexure lengths were modified in these runs to find a design that met the stress and stiffness goals. Some initial conclusions were made from these runs:

a) Linkage thicknesses above 0.08" only minimally increased stiffness while increasing the stress concentration. Therefore, a linkage thickness of 0.08" was selected.
b) The optimum flexure in the first stage linkage is the shortest possible length. The outside flexure drives the series stiffness. If the flexures were long the top linkage would rotate without rotating the middle linkage. The tensile stress with the highest stack load and thinnest flexure is below the allowable 50 ksi. The bending stress in the flexure is related to t/L. Therefore, for a given allowable stress, the minimum allowable length design is obtained when the thickness is minimized. Therefore the outside flexures were set to the minimum allowable thickness(0.020"—bench-top), and the minimum length that met the bending stress requirement.

c) The middle flexure drives the parallel stiffness more than the series stiffness. Therefore, the middle linkage thickness was set to 0.02" for the entire length. This gave a conservative stress design.

The result of the FEA modifications was a lever with the following estimated performance characteristics:

TABLE 1

Estimated Bench-top Lever Performance

| Parameter | Estimated Value |
| --- | --- |
| Peak Stress (ksi) | 46.35 |
| Lever Ratio | 10.8:1 |
| Blocked Stiffness(lb/in) | 1.4e6 |
| Free Stiffness(lb/in) | 247,000 |

The system model was used to predict the actuator performance with these lever characteristics as well as the characteristics of the bench-top stacks. The results of this analysis are in Table 2.

TABLE 2

Projected bench-top Flexure Actuator Performance

| Parameter | Estimated Value |
| --- | --- |
| Free Displacement(in.) | 0.011 |
| Blocked Force(lb) | 49.13 |
| Bandwidth(Hz) | 1013 |

After the flexure design was completed, the table and pre-load plate were defined. Both of these parts were sized based on stiffness. Both parts were modeled with three point bending from the stack load. The parts were sized to have a stiffness of greater than 5 million pounds per inch.

EXAMPLE 3

Fluid Lever Design

Figure 31:
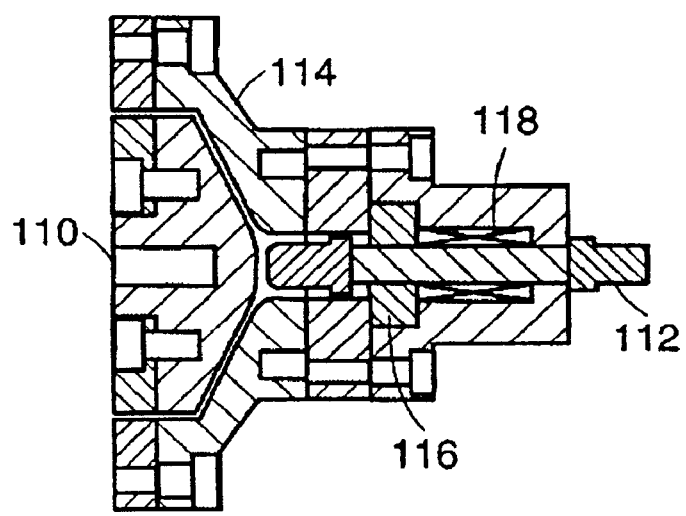
FIG. 31 illustrates an embodiment of a fluid lever design in accordance with the invention.

FIG. 31 shows a fluid lever in accordance with a levered piezoelectric stack actuator of the invention. The initial step in designing the fluid lever was selecting the size of the input and output pistons (110 and 112, respectively). The lever ratio was set to 30, and the input piston (110) was defined based on the minimum sized rolling diagram that could meet the stroke requirements. From these two parameters the input piston (110) was defined. A maximum strain calculation was completed on the input gasket to ensure that the polyester reinforced gasket material and bench-top seal tests would not fail. The aluminum housing (114) and seal flanges were then defined based on the geometry requirements at the input and output ends. On the output side, a return spring (116) was required since theoretically the lever would have no free stiffness. In order to save axial length, a conical spring was selected. The return spring pre-load force was defined based on the total modal mass of the lever. If the return speed was lower than the rise speed the bandwidth would be limited needlessly. The stiffness of the spring was minimized in order to reduce the parasitic effect of the free stiffness in the lever. The stiffness was set to 0.5 pounds per inch. Since the potential output was large (0.1 to 0.2 inches) a linear bearing (118) was required on the output piston in order to guarantee linear travel.

The foregoing description of the operation of several illustrative and preferred embodiments of the invention has been undertaken to show the principles thereof and details of construction for enhanced performance hybrid actuators. Being thus disclosed, further variations and modifications will occur to those skilled in the art, and all such further variations and modifications are intended to be with the scope of the invention, as defined in the claims appended hereto.

What is claimed is:

1. An actuator device comprising:
    a housing defining a fluid reservoir
    an electroactive stack comprising at least two electroactive elements, said stack being disposed within said housing, said stack having a major movable displacing face for displacing fluid in the reservoir and forming a bounding wall of the reservoir, said fluid filling the reservoir
    a first stage mechanical lever activatable by said electroactive stack;
    a second stage output fluid lever activatable by said first stage mechanical lever; and
    an output piston slidably moving into the reservoir such that motion of the piston tracks displacement of fluid within the reservoir, displacement of fluid being caused by motion of said displacing face, and including means for enhancing fluid displaced by said member with it is electrically actuated,
    wherein, upon actuation, said electroactive stacks acts upon the first stage mechanical lever, which upon activation, acts upon the second stage output fluid lever, which in turn, upon activation, causes said output piston to move.

2. The actuator device of claim 1, said second stage output fluid lever comprising
    a slidibly movable input piston;
    an output shaft; and
    a return spring in physical communication with said output shaft;
    wherein, upon activation of said second stage output fluid lever, said input piston moves so as to physically contact said output shaft.

3. The actuator device of claim 2, wherein said second stage output fluid lever further comprises a linear ball bearing.

4. The actuator device of claim 1, wherein said first stage mechanical lever is a flexure lever comprising
    a first linkage activatable by said electroactive element; and
    a second linkage activatable by said first linkage; and
    wherein, upon actuation, said electroactive element acts upon the first linkage, which upon activation, acts upon the second linkage, which in turn, upon activation, acts upon the second stage output fluid lever.

5. The actuator device of claim 4, wherein each of said first and second linkages have angles which change upon activation such that each of said first and second linkages have lever ratios of about 10:1.

6. An actuator device comprising:

an electroactive element having a major movable displacing face which moves when electrically actuated to increase and decrease its length;

a first stage mechanical lever activatable by said electroactive element;

a second stage output fluid lever activatable by said first stage mechanical lever; and a slidably movable output piston;

wherein, upon actuation, said electroactive element acts upon the first stage mechanical lever, which upon activation, acts upon the second stage output fluid lever, which in turn, upon activation, causes said output piston to move.

7. The actuator device of claim 6, said second stage output fluid lever comprising a slidibly movable input piston;

an output shaft; and a return spring in physical communication with said output shaft;

wherein, upon activation of said second stage output fluid lever, said input piston moves so as to physically contact said output shaft.

8. The actuator device of claim 7, wherein said second stage output fluid lever further comprises a linear ball bearing.

9. The actuator device of claim 6, wherein said output piston applies a force to an outside object.

10. The actuator device of claim 6 further comprising a housing, and wherein said electroactive element is disposed within said housing.

11. The actuator device of claim 6, wherein said first stage mechanical lever is a flexure lever comprising a first linkage activatable by said electroactive element; and a second linkage activatable by said first linkage; and wherein, upon actuation, said electroactive element acts upon the first linkage, which upon activation, acts upon the second linkage, which in turn, upon activation, acts upon the second stage output fluid lever.

12. The actuator device of claim 11, wherein each of said first and second linkages have angles which change upon activation such that each of said first and second linkages have lever ratios of about 10:1.

13. The actuator device of claim 12, wherein said output piston applies a force to an outside object.

* * * * *

UNITED STATES PATENT AND TRADEMARK OFFICE
CERTIFICATE OF CORRECTION

PATENT NO.    : 6,291,928 B1
DATED         : September 18, 2001
INVENTOR(S)   : Lazarus et al.

It is certified that error appears in the above-identified patent and that said Letters Patent is hereby corrected as shown below:

Column 18,
Line 22, "12" should be replaced with -- 11 --.

Signed and Sealed this

Twenty-fifth Day of June, 2002

*Attest:*

JAMES E. ROGAN
*Director of the United States Patent and Trademark Office*

*Attesting Officer*